US009169889B1

(12) United States Patent
Miyamoto (10) Patent No.: US 9,169,889 B1
(45) Date of Patent: Oct. 27, 2015

(54) FLUID PRESSURE OPERATED DEVICE WITH ADJUSTABLE POSITIONING OF MOUNTING ELEMENTS RELATIVE TO EXTERNALLY MOUNTED STRUCTURES

(75) Inventor: Jason Miyamoto, San Diego, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 1901 days.

(21) Appl. No.: 11/626,944

(22) Filed: Jan. 25, 2007

Related U.S. Application Data (60) Provisional application No. 60/772,821, filed on Feb. 13, 2006.

(51) Int. Cl.
| F16F 9/44 | (2006.01) |
| F16F 9/00 | (2006.01) |
| F16F 9/34 | (2006.01) |
| F16F 9/32 | (2006.01) |

(52) U.S. Cl.
CPC ....... *F16F 9/3242* (2013.01); *F16F 2230/0005* (2013.01)

(58) Field of Classification Search
CPC .......... F16F 9/3242; F16F 2230/0005
USPC ............ 188/322.19, 321.11, 314, 285, 300
See application file for complete search history.

(56) References Cited

U.S. PATENT DOCUMENTS

| 2,796,955 | A | | 5/1957 | Klein | |
|---|---|---|---|---|---|
| 3,984,119 | A | * | 10/1976 | Okazima | 280/276 |
| 4,465,296 | A | * | 8/1984 | Shiratori et al. | 280/124.155 |
| 4,798,398 | A | | 1/1989 | Cummins | |
| 5,178,239 | A | * | 1/1993 | Homme | 188/315 |
| 5,467,971 | A | * | 11/1995 | Hurtubise et al. | 267/220 |
| 5,484,161 | A | * | 1/1996 | McIntyre | 280/124.155 |
| D371,334 | S | * | 7/1996 | Hotchkis et al. | D12/159 |
| 5,848,675 | A | * | 12/1998 | Gonzalez | 188/319.2 |
| 5,848,799 | A | * | 12/1998 | Huan | 280/276 |
| 5,979,218 | A | * | 11/1999 | Biddle et al. | 73/11.04 |
| 5,988,332 | A | | 11/1999 | Marzocchi | |

(Continued)

FOREIGN PATENT DOCUMENTS

| DE | 4022145 | 1/1992 |
| DE | 102005009152 | 8/2006 |

(Continued)

OTHER PUBLICATIONS

FOX Bypass Shock Information.

(Continued)

*Primary Examiner* — Robert A Siconolfi
*Assistant Examiner* — James Hsiao
(74) *Attorney, Agent, or Firm* — Patterson & Sheridan, LLP; David M. Haugen (57) ABSTRACT

The invention is generally directed to the field of fluid pressure operated devices such as air springs and fluid dampers and more specifically directed to the field of such devices having externally mounted structures. In particular, one of the mounting elements, such as a mounting hole for mounting the device between sprung and un-spring masses can be reoriented relative to the device and its externally mounted structures. Therefore, the reorientation of the mounting element may be achieved: using ordinary maintenance techniques and tools, without accessing the inside of the device and especially the fluid contained within the device, and/or without changing the length of the device.

20 Claims, 4 Drawing Sheets

(56) References Cited

U.S. PATENT DOCUMENTS

| | | | |
|---|---|---|---|
| 6,105,740 A | 8/2000 | Marzocchi | |
| 6,220,408 B1 | 4/2001 | Pradel | |
| 6,230,856 B1 * | 5/2001 | Kanjo | 188/196 P |
| 6,257,601 B1 * | 7/2001 | Spears et al. | 280/86.752 |
| 6,296,092 B1 | 10/2001 | Marking | |
| 6,328,321 B1 * | 12/2001 | Nolan | 280/86.754 |
| 6,382,645 B1 * | 5/2002 | Gravelle et al. | 280/86.754 |
| 6,415,895 B2 | 7/2002 | Marking | |
| 6,443,271 B2 * | 9/2002 | Schmidt | 188/285 |
| 6,485,223 B1 * | 11/2002 | Van Schmus et al. | 403/408.1 |
| 6,592,136 B2 * | 7/2003 | Becker et al. | 280/276 |
| 6,749,047 B2 * | 6/2004 | Koyano et al. | 188/321.11 |
| D494,894 S * | 8/2004 | Carlson | D12/160 |
| 6,843,352 B2 * | 1/2005 | Jacoby et al. | 188/321.11 |
| 6,892,865 B2 | 5/2005 | Van Wonderen | |
| 7,017,892 B2 | 3/2006 | Hurrlein | |
| 7,144,021 B2 | 12/2006 | Carlson | |
| 7,216,840 B2 * | 5/2007 | Fang | 248/425 |
| 7,270,222 B1 * | 9/2007 | Aymar | 188/285 |
| 7,350,779 B2 * | 4/2008 | Tamura | 267/220 |
| 7,364,143 B2 * | 4/2008 | Chen | 267/64.22 |
| 7,410,038 B2 * | 8/2008 | Kleinert et al. | 188/300 |
| 8,196,947 B2 * | 6/2012 | Achenbach et al. | 280/276 |
| 2002/0163155 A1 * | 11/2002 | Kawada et al. | 280/124.155 |
| 2003/0029683 A1 * | 2/2003 | Oliver et al. | 188/267.2 |
| 2003/0160372 A1 | 8/2003 | Klitsch | |
| 2004/0090020 A1 | 5/2004 | Braswell | |
| 2004/0094033 A1 * | 5/2004 | Kau | 92/169.1 |
| 2005/0012255 A1 | 1/2005 | Denk | |
| 2005/0115785 A1 * | 6/2005 | Thomas | 188/321.11 |
| 2005/0133322 A1 * | 6/2005 | Huprikar et al. | 188/321.11 |
| 2006/0049561 A1 | 3/2006 | Chapman | |
| 2006/0054436 A1 | 3/2006 | Handke | |
| 2006/0096817 A1 | 5/2006 | Norgaard | |
| 2007/0144849 A1 | 6/2007 | Breun | |
| 2007/0170027 A1 * | 7/2007 | Kim | 188/321.11 |
| 2010/0006382 A1 * | 1/2010 | Ahn | 188/321.11 |

FOREIGN PATENT DOCUMENTS

| | | |
|---|---|---|
| FR | 2335747 | 7/1977 |
| GB | 0562052 | 6/1944 |
| GB | 0570003 | 6/1945 |
| GB | 1060247 | 3/1967 |
| JP | 2006-170237 | 6/2006 |

OTHER PUBLICATIONS

Bilstein Web Pages (See 9100/9300 Series)(2005-2007).
Racerunner Web pages (3 pages) (2004).

* cited by examiner

FLUID PRESSURE OPERATED DEVICE WITH ADJUSTABLE POSITIONING OF MOUNTING ELEMENTS RELATIVE TO EXTERNALLY MOUNTED STRUCTURES

FIELD OF THE INVENTION

The current invention is generally directed to the field of fluid pressure operated devices, such as gas springs or fluid dampers and more specifically directed to the field of fluid pressure operated devices having externally mounted structures such as fluid reservoirs, filling tubes, or external bypass tubes. The externally mounted structures may typically be mounted to the fluid pressure operated device or its working cylinder in a fixed or permanent position.

All patents and patent applications referred to herein are incorporated by reference into this patent application in their entirety.

BACKGROUND OF THE INVENTION

As previously mentioned, the current invention is generally directed to the field of fluid pressure operated devices, such as gas springs or fluid dampers and more specifically directed to the field of fluid pressure operated devices having externally mounted structures such as fluid reservoirs, filling tubes, or external bypass tubes. An example of such a device in the form of a fluid damper is manufactured by Fox Factory, Inc., assignee of the current application, and sold under the following product names: Bypass 2.0, Bypass 2.5, Bypass 3.0, Bypass 3.5, and Bypass 4.3. These fluid dampers may include such externally mounted structures as an externally mounted fluid reservoir and/or at least one external bypass tube. By using external bypass tubes, bypass channels and bypass cylinders, such as described in assignee's U.S. Pat. No. 6,296,092 (Marking) and U.S. Pat. No. 6,415,895 (Marking), are no longer necessary while still providing a damper with position sensitive damping.

However, in general, unless the positioning of the external structures relative to the fluid pressure operated device's mounting elements is custom to every possible application or installation, it is possible that in mass-manufactured fluid pressure operated devices, the externally mounted structures, which typically are in fixed or permanent positions relative to the working cylinder, can sometimes be in a position that conflicts with vehicle structures, such as fenders. This may actually wind up prohibiting the use of the mass-manufactured fluid pressure operated device on that vehicle or require re-machining of components of the fluid pressure operated device. Both of these situations are undesirable.

In U.S. Pat. No. 5,988,332 (Marzocchi) and U.S. Pat. No. 6,105,740 (Marzocchi) (hereinafter "the Marzocchi patents"), this problem was identified and a solution making the external component (i.e. compensator) movable relative to the damper cylinder is described. See also, Racerunner 2" Piggyback Shock (www.swayaway.com).

Swayaway has another design in which allows the shock body to rotate 360° for ease of installation and eliminates the need for left and right specific shocks. See 2.5" 3 Tube Piggyback Bypass Shock (www.swayaway.com).

Additionally, in GB 1,060,247 (Price) (GB '247), the same problem was identified in an air spring device. GB '247 proposes that the position of the cylinder may be adjustably maintained relative to a support platform using a double-threaded turnbuckle arrangement which has one end screwed into the lower end of the cylinder and the other end screwed into a terminal fitting forming a part of lower ball joint fixture. Adjustment may be made by turning a knurled sleeve and further movement prevented by setscrews. This design faces potential problems. In particular, threads are relied upon and threads may lock-up and bind once oil and grime starts to fill their grooves. Furthermore, threads cause the length of the working cylinder to change when the cylinder is adjusted. This may, in some instances, adversely affect device mounting or performance. Finally, GB '247 does not appear to be infinitely adjustable since adjustment is limited to thread length and pitch.

Accordingly, there is room for improvement within the art of fluid operated devices such as air springs and fluid dampers.

DETAILED DESCRIPTION OF THE DRAWINGS

Figure 1:
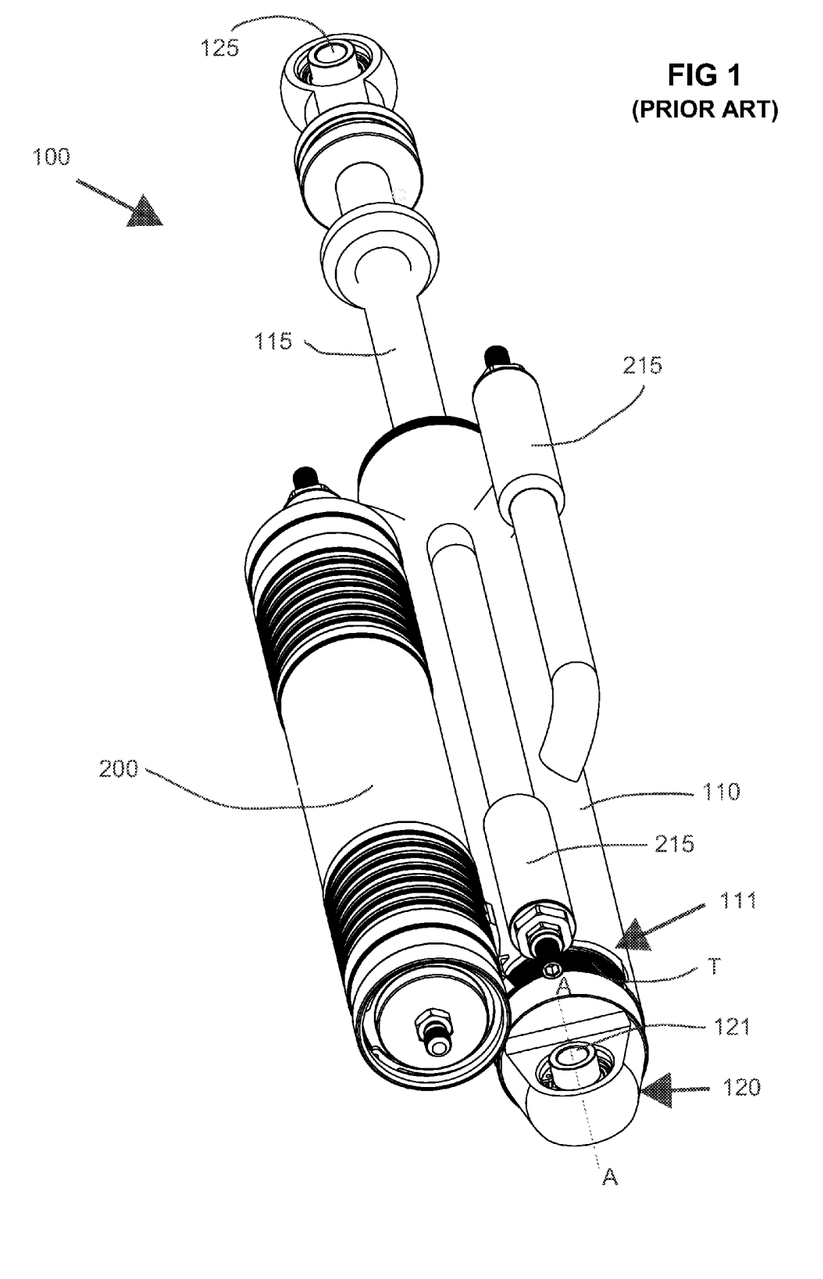
FIG. 1 depicts a perspective view of a prior art fluid pressure operated device in the forms of a fluid damper having an externally mounted fluid reservoir and external bypass tubes.

FIG. 1 depicts a fluid pressure operated device in the exemplary form of a conventional fluid damper 100. Typically, a damper such as this one, with its large fluid volumes, is used in off-road applications. However, the invention is equally applicable to other types of dampers or devices having externally mounted structures. For example, mountain bicycle dampers may often have externally mounted piggyback reservoirs whose size and positioning may sometimes conflict with its mounting location on the bicycle frame (see e.g. the Marzocchi patents).

As is known in the art, damper 100 includes a working cylinder, for example, a damper cylinder 110 and a damper shaft 115. Damper haft 115 supports the damping piston (not shown) and moves into and out of damper cylinder 110 as the damper compresses and rebounds, respectively. Damper shaft 115 is also provided with a first mounting element, such as a mounting hole 125 (sometimes referred to as an eyelet).

Damper cylinder 110 includes a body cap 120 for attaching to the end of the damper cylinder opposite the damper shaft 115. In some instances, such as shown in the attached FIGS, body cap 120 seals an open end 111 of damper cylinder 115, which provides access to the damping fluid in monotube designs. Body cap 120 also includes a second mounting element, such as a mounting hole 121 (sometimes referred to as an eyelet). Mounting elements 121, 125 allow damper 100 to be mounted between sprung and un-sprung masses.

Damper 100 may include a number of externally mounted structures. Furthermore, as previously mentioned, these externally mounted structures may be mounted to the damper cylinder in a fixed or permanent position. For example, damper 100 may include a piggyback reservoir assembly 200. Additionally or alternatively, damper 100 may include at least one external bypass tube 215. Bypass tubes provide additional flow paths for damping fluid around the damping piston (not shown). By positioning the entrances and exits to the bypass tubes at strategic locations along the piston travel, the damper 100 can be provided with position sensitivity (i.e. different damping rates at different piston stroke depths). The general use of external bypasses around a damping piston is discussed in, for example, U.S. Pat. No. 4,798,398 (Cummins) and USPub 2006/0096817 (Norgaard). However, the details of the operation of damper 100 and bypass tubes 215 are not essential to an understanding of the current invention.

Typically, according to the prior art, body cap 120 is screwed into the open end of damper cylinder 110, which is opposite to the end of the damper cylinder 110 from which shaft 115 extends using threads T associated with body cap 120 and open end 111. As thread pitches and length are fixed during the product design phase, upon proper manufacture of damper 100, all such dampers 100 having a particular thread length and pitch design will generally (i.e., subject to manufacturing tolerances) have their mounting holes 121 at the same specific orientation relative to damper cylinder 110 and its externally mounted structures. In FIG. 1, this orientation is depicted by line A-A. Therefore, the damper cylinder 110 portion of damper 100 will only be able to be mounted to a vehicle in one orientation. If mounting according to this one orientation is prevented due to structural conflicts between the externally mounted structures of damper 100 and vehicle components, the damper 100, unless modified in some way, will be unusable on that vehicle. While damper 100 is typically designed to be usable on as many different vehicles as possible, it cannot be guaranteed that identical mass-manufactured dampers 100 can be mounted in all vehicles free of structural conflicts. Potential structural conflicts may be especially prevalent in off-road applications where entirely custom designed vehicles (e.g. dune buggies) and/or extensive user-modifications of stock vehicles may exist.

Currently, besides for the proposals of the Marzocchi patents to have the external components move relative to the damper cylinder and GB '247's proposal to use a threaded system (both previously described above), adjusting the orientation of mounting hole 121 relative to the externally mounted structures may require re-machining and modification of damper 100. In particular, the damper 100 is depressurized (discharged), taken apart, body cap 120 removed and put in a lathe, and a skim cut is made on the body cap 120. This allows the body cap 120 to thread further into the damper cylinder 110 than as originally designed, thus changing the orientation of the body cap 120 and its mounting hole 121 relative to the externally mounted structures. This method may also affect the length of the damper 100.

Figure 2:
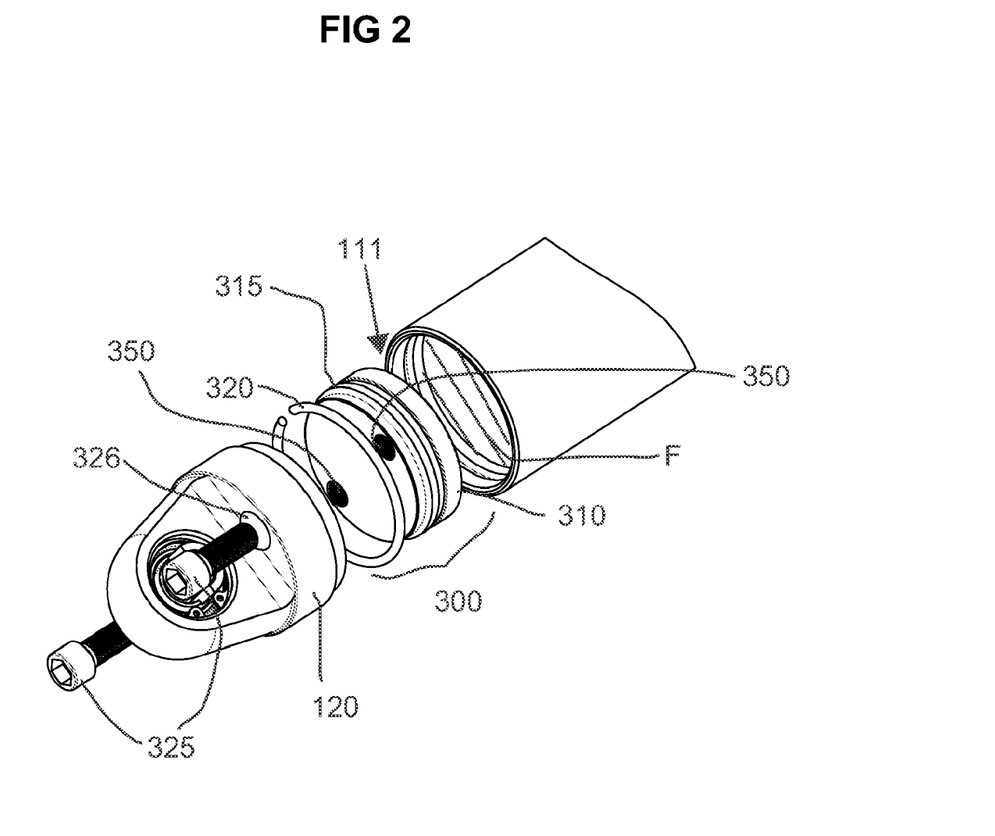
FIG. 2 depicts a portion of a damper provided with an exemplary embodiment of the invention

An exemplary embodiment of the invention is shown in FIG. 2 as applied to a fluid pressure operated device in the form of a fluid damper 100. As previously mentioned, damper 100 includes a damper cylinder 110 having end 111, opposite to the end of damper cylinder 110 from which damper shaft 115 extends. Typically, this end 111 will be an open end that provides access to the interior of the damper cylinder 110 and the damping fluid inside the damper cylinder 110.

According to an exemplary embodiment of the invention, an adapter assembly 300 may be positioned intermediate the body cap 120 and damper cylinder 110 and used to attach the body cap 120 to damper cylinder 110. Thus, in this exemplary embodiment of the invention, threads T of damper cylinder 110 should be eliminated. Adapter assembly 300 may include an adapter 310, in the form of a disk having a seal, for example, in the form of an o-ring 315, along its outer perimeter. Adapter 310 is press fit into open end 111 due to the friction of the o-ring 315. A retaining ring 320 may then be positioned over adapter 310 to retain adapter 310 in its proper axial position. However, neither the retention force of ring 320 or the friction of the o-ring 315 are high enough to prevent rotation of adapter 310.

Body cap 120 is now positioned over end 111 of damper cylinder 110 and holes 326 in body cap 120 are aligned with holes 350 of adapter 310. Fasteners, for example threaded fasteners 325, are then inserted through holes 326 in body cap 120 and partially threaded into threaded holes 350 of adapter 310. This process loosely attaches body cap 120 to adapter disk 310. Now, if necessary, the orientation of body cap 120 and mounting hole 121 relative to the damper cylinder 110 can be adjusted by rotating body cap 120 and adapter 310. Because threads need not be used, the body cap can be rotated any number of times in any direction until the proper orientation of mounting hole 121 is achieved and without effecting the overall length of damper 100. After the desired orientation of mounting hole 121 is achieved, the adapter assembly is completely fastened to the body cap 120, such as by threaded fasteners 325. For the adapter assembly to be properly attached to body cap 120, fasteners 325 are torqued to within specification limits, therefore, clamping down body cap 120 so that body cap 120 can no longer rotate. Damper 100 is now sealed and ready to be pressurized and mounted on a vehicle.

When a user receives a sealed and pressurized damper 100 from the manufacturer and discovers that there is a structural conflict in mounting the damper 100, the invention is simple enough to allow for the user to make the orientation adjustment using ordinary maintenance techniques and tools and without returning the damper 100 to its manufacturer. The user first depressurizes (discharges) the damper 100. This procedure is well within the realm of user-conducted maintenance and often described in literature associated with the damper 100 (e.g. instruction manual). The user then partially loosens threaded fasteners 325. This allows the user to rotate body cap 120 and adapter 310 without having to open the damper cylinder 110 and without accessing the inside of the damper cylinder 110 and especially the damping fluid (a potentially messy prospect). As above, after the desired orientation of mounting hole 121 is achieved, threaded fasteners 325 are torqued back to specification and damper 100 is now sealed and ready to be pressurized by the user and mounted on a vehicle.

Figure 3A:
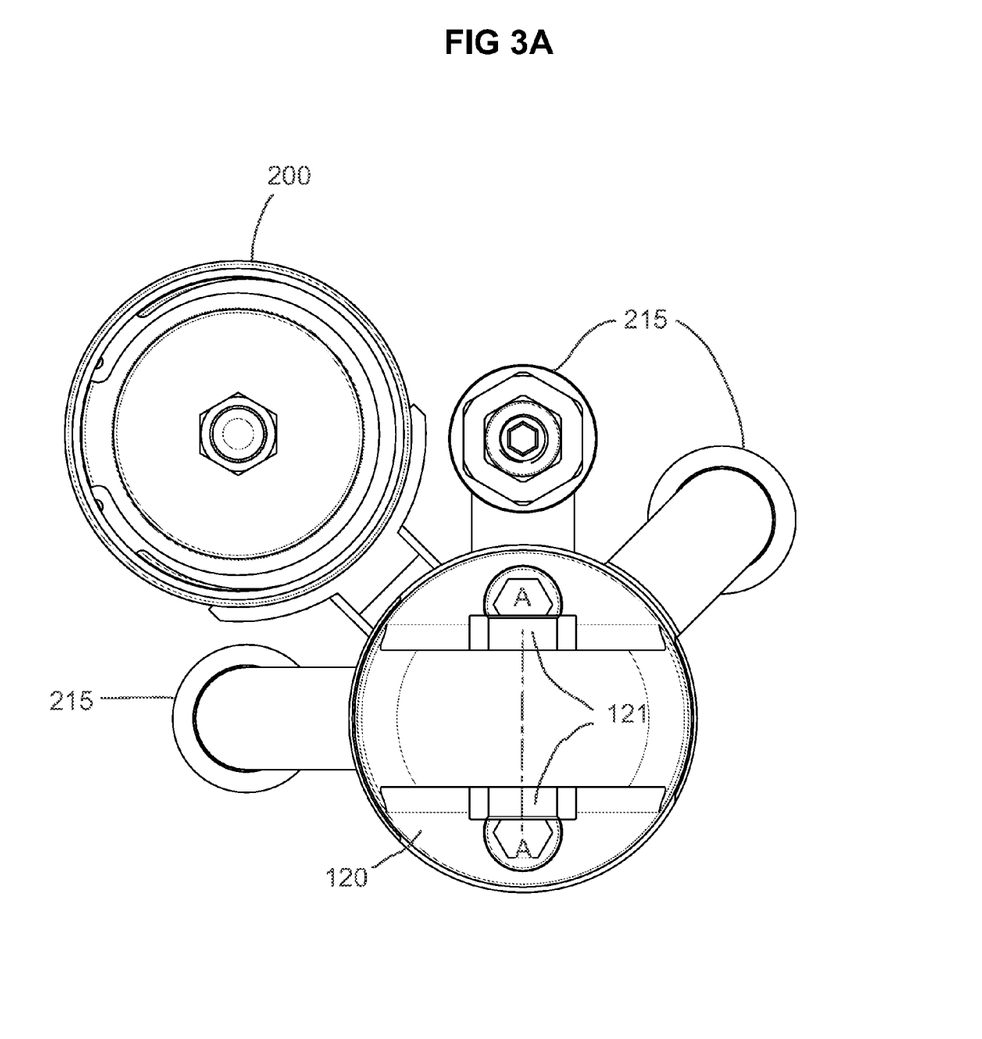
FIGS. 3A and 3B show different orientations of a mounting element relative to a damper and according to an exemplary embodiment of the invention.
Figure 3B:
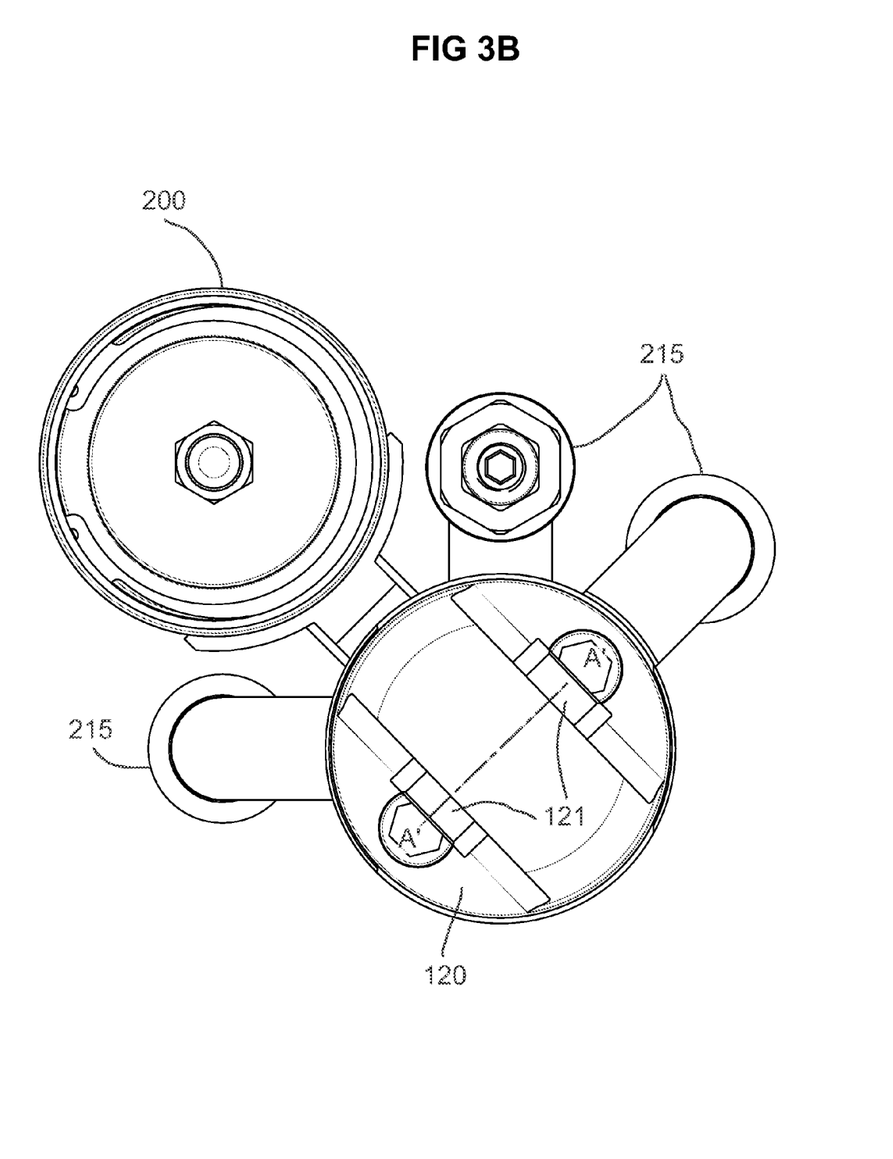

The results achieved by the exemplary embodiment of the invention are generally depicted in FIG. 3A and FIG. 3B. In particular, in FIG. 3A, body cap 120 and mounting hole 121 have a first orientation relative to reservoir 200 and externally mounted bypass tubes 215. This first orientation is represented by line A-A. In FIG. 3B, body cap 120 and mounting hole 121 have been reoriented using the teachings of the exemplary embodiment of the invention and therefore have a different orientation relative to reservoir 200 and externally mounted bypass tubes 215. This different orientation is represented by line A'-A'. However, despite the change in orientation, the overall length of damper 100 remains the same.

Although the invention has been described in terms of a certain exemplary embodiment and process, other embodiments and processes apparent to those of ordinary skill in the art are also within the scope of this invention. Thus, various changes and modifications may be made without departing from the spirit and scope of this invention.

Accordingly, the scope of the invention should only be defined by the appended claims.

Reference Numerals Used

| Reference Numeral | Item |
| --- | --- |
| 100 | damper |
| 110 | damper cylinder |
| 111 | end of damper cylinder |
| 115 | shaft |
| 120 | body cap |

-continued

Reference Numerals Used

| Reference Numeral | Item |
| --- | --- |
| 121, 125 | mounting holes |
| 200 | piggyback reservoir assembly |
| 215 | external bypass tubes |
| 300 | adapter assembly |
| 310 | adapter |
| 315 | seal |
| 320 | retaining ring |
| 325 | fasteners |
| 326 | holes |
| 350 | holes |
| T | threads |
| F | fluid |

That which is claimed:

1. A fluid pressure operated device, comprising:
a working cylinder having a first end and a second end;
a shaft that moves into and out of the first end of the working cylinder as the device compresses and rebounds, the shaft including a first mounting element attached thereto;
a body cap for attachment to the second end of the working cylinder opposite the shaft, the body cap including a second mounting element;
an adapter assembly disposable between the working cylinder and the body cap, the adapter assembly allowing orientation of the second mounting element of the body cap to be changed, wherein the adapter assembly includes:
an adapter disk that can be fit into the second end of the working cylinder and is capable of rotation, the adapter disk includes at least one threaded hole, the body includes at least one hole, the body cap is attached to the adapter disk using at least one threaded fastener passing through the at least one hole in the body cap and being threaded into the at least one threaded hole of the adapter disk;
whereby the second mounting element can be rotated without causing movement of the shaft and whereby a length of the fluid pressure operated device remains constant when the orientation of the second mounting element is changed.

2. A fluid pressure operated device, comprising:
a working cylinder having a first end and a second end;
a shaft for movement into and out of the first end of the working cylinder, the shaft including a first mounting element attached thereto;
the working cylinder including a body cap attached to the second end of the working cylinder opposite the shaft, the body cap including a second mounting element;
at least one externally mounted structure attached to the working cylinder;
an adapter assembly allowing the orientation of the second mounting element of the body cap relative to the at least one externally mounted structure to be changed whereby:
a) the adapter assembly is positioned between the working cylinder and the body cap;
b) the adapter assembly includes an adapter disk that can be fit into the second end of the working cylinder and is capable of rotation, the adapter disk includes at least one threaded hole, the body cap includes at least one hole, and the body cap is attached to the adapter disk using at least one threaded fastener passing through the at least one hole in the body cap and being threaded into the at least one threaded hole of the adapter disk,
wherein, when the adapter assembly is attached to the body cap by the at least one fastener and at least a minimum torque is applied to the at least one fastener, the orientation of the second mounting element is fixed.

3. The fluid pressure operated device of claim 2, wherein the fluid pressure operated device comprises a fluid damper and at least one of the externally mounted structures includes a bypass tube mounted to the working cylinder for providing the fluid damper with position sensitive damping.

4. The fluid pressure operated device of claim 2, wherein at least one of the mounting elements include a mounting hole.

5. The fluid pressure operated device of claim 2, wherein the orientation of the second mounting element of the body cap relative to the externally mounted structure can be adjusted between an infinite number of positions.

6. The fluid pressure operated device according to claim 2, wherein:
when the body cap can no longer rotate relative to the working cylinder, the adapter disk is no longer capable of rotation.

7. A fluid pressure operated device, comprising:
a working cylinder, the working cylinder including:
a) at least one externally mounted structure;
b) at least one open end on the working cylinder for accessing at least a portion of the inside of the working cylinder; and
c) a body cap for sealing closed the open end of the working cylinder, the body cap including a mounting element;
d) an adapter assembly for attaching the body cap to the working cylinder, wherein the adapter assembly includes an adapter disk that can be fit into the open end of the working cylinder and is capable of rotation, wherein the adapter disk includes at least one threaded hole, the body cap includes at least one hole, and the body cap is attached to the adapter disk using at least one threaded fastener through the at least one hole in the body cap and being threaded into the at least one threaded hole of the adapter disk; and
e) wherein the adapter assembly allows adjusting the orientation of the body cap and its mounting element relative to the externally mounted structure without using threads, the second mounting element can be rotated without causing movement of the shaft and the overall length of the device remains constant when the orientation of the body cap and its mounting element are adjusted.

8. The device of claim 7, wherein the body cap and the adapter assembly are coupled together to adjust the orientation of the body cap and its mounting element.

9. The device of claim 7, wherein when a minimum torque is applied to the at least one threaded fastener, the body cap and its mounting element are in a fixed orientation.

10. The device of claim 1, wherein the adapter assembly includes the adapter disk, a retainer ring, and a seal.

11. The device of claim 1, wherein when the at least one fastener is inserted through the at least one hole in the body cap and partially threaded into the at least one threaded hole of the adaptor disk, the orientation of the second mounting element relative to the working cylinder may be changed.

12. The device of claim 1, wherein when the at least one fastener is inserted through the at least one hole in the body cap and completely threaded into the at least one threaded hole of the adaptor disk and at least a minimum amount of torque is applied to the at least one fastener, the orientation of the second mounting element relative to the working cylinder is fixed.

13. A fluid pressure operated device, comprising:
a working cylinder having a first end and a second end;
a shaft that moves into and out of the first end of the working cylinder as the device compresses and rebounds, the shaft including a first mounting element attached thereto;
a body cap for attachment to the second end of the working cylinder opposite the shaft, the body cap including a second mounting element;
an adapter assembly disposable between the working cylinder and the body cap, the assembly having a first configuration whereby the second mounting element is axially fixed but rotationally movable relative to the working cylinder and a second configuration wherein the second mounting element is axially and rotationally fixed relative to the working cylinder, wherein the adapter assembly includes an adapter disk that can be fit into the second end of the working cylinder and is capable of rotation, the adapter disk includes at least one threaded hole the body cap includes at least one hole, and the body cap is attached to the adapter disk using at least one threaded fastener passing through the at least one hole in the body cap and being threaded into the at least one threaded hole of the adapter disk to rotationally fix the second mounting element relative to the working cylinder;
whereby an overall length of the device and any operating characteristics of the device remain constant in the first and second configurations.

14. The device of claim 13, wherein the body cap is coupled to the adapter assembly in the first and second configurations.

15. The device of claim 13, wherein when the at least one threaded fastener is partially threaded into the adapter assembly, the adapter assembly is in its first configuration.

16. The device of claim 13, wherein when the at least one threaded fastener is completely threaded into the adapter assembly and at least a minimum torque is applied to the at least one threaded fastener, the adapter assembly is in its second configuration.

17. A fluid pressure operated device, comprising:
a working cylinder having a first end, a second end, and a longitudinal axis;
a shaft that moves into and out of the first end of the working cylinder;
a body cap for attachment to the second end of the working cylinder opposite the shaft, the body cap including a mounting element having an aperture with a longitudinal axis extending therethrough, wherein the longitudinal axis of the aperture is perpendicular to the longitudinal axis of the working cylinder; and
an adapter assembly disposable between the working cylinder and the body cap, the adapter assembly allowing orientation of the mounting element of the body cap to be changed, whereby the mounting element can be rotated without causing movement of the shaft, wherein the adapter assembly includes an adapter disk that can be fit into the second end of the working cylinder and is capable of rotation, wherein the adapter disk includes at least one threaded hole, the body cap includes at least one hole, and the body cap is attached to the adapter disk using at least one threaded fastener passing through the at least one hole in the body cap and being threaded into the at least one threaded hole of the adapter disk.

18. The device of claim 17, wherein the shaft moves into and out of the first end of the working cylinder as the device compresses and rebounds.

19. The device of claim 17, wherein the shaft comprises a second mounting element attached thereto.

20. The device of claim 17, wherein a length of the fluid pressure operated device remains constant when the orientation of the second mounting element is changed.

* * * * *

UNITED STATES PATENT AND TRADEMARK OFFICE
CERTIFICATE OF CORRECTION

| | | |
|---|---|---|
| PATENT NO. | : 9,169,889 B1 | Page 1 of 1 |
| APPLICATION NO. | : 11/626944 | |
| DATED | : October 27, 2015 | |
| INVENTOR(S) | : Jason Miyamoto | |

It is certified that error appears in the above-identified patent and that said Letters Patent is hereby corrected as shown below:

In the Claims:

Column 5, Claim 1, Line 37, please insert --cap-- before includes;

Column 5, Claim 1, Line 37, please insert --and-- before the;

Column 6, Claim 7, Line 40, please insert --passing-- before through.

Signed and Sealed this
First Day of March, 2016

Michelle K. Lee
*Director of the United States Patent and Trademark Office*